April 20, 1965     W. R. SCHLEGEL     3,179,358
SELF-BRAKING SWIVEL FOR AIRCRAFT ARRESTING UNITS
WITH CROSS RUNWAY ARREST CABLES
Original Filed Aug. 13, 1963

INVENTOR
William R. Schlegel

BY  *Herbert M. Birch*

ATTORNEY

United States Patent Office 3,179,358
Patented Apr. 20, 1965

3,179,358
SELF-BRAKING SWIVEL FOR AIRCRAFT ARRESTING UNITS WITH CROSS RUNWAY ARREST CABLES
William R. Schlegel, Wilmington, Del., assignor, by mesne assignments, to the United States of America as represented by the Administrator of the Federal Aviation Agency
Original application Aug. 13, 1963, Ser. No. 301,860. Divided and this application May 14, 1964, Ser. No. 367,393
7 Claims. (Cl. 244—110)

The present invention relates generally to a swivel and particularly to a self-braking swivel for aircraft arresting gear with a cross runway arrest cable and is a division of my prior co-pending application Serial Number 301,860, filed August 13, 1963, for a "Self-Braking Swivel."

The swivel construction of this invention may be used in any line connection where a swivel is needed and every likely use will not be described here in detail, however, this application relates specifically to the use of the swivel in connection with long runout aircraft arresting gear using an arrest hook arrest cable. For example, a swivel is required in such arrest gear to provide an intermediate point of rotation between the aircraft and the arrest unit during arrest cable relaxation at the cessation of high tensions. Without a swivel or with a malfunctioning swivel the torque within the tensioned helical formed metal arrest cable due to its helical construction causes it to twist upon itself often creating permanent damage and destruction of the arrest cable and sometimes to the arrest units themselves.

Prior to the present invention, it was common practice to utilize a version of a standard commercial ball bearing swivel for use as an intermediate link between the purchase cable and a deck pendant or cross runway cable on long runout aircraft arresting gears. These standard commercial ball bearing swivels are made for static thrust loading at low rotational speeds and are not suitable for arresting gear, wherein rotational accelerations of relatively high speeds develop during arrest, for example, in excess of 3,000 r.p.m. Also, during long runout arrests there are shock loads in both thrust and radial directions with respect to the axis of arrest cable rotation. Such use of standard swivels with arresting gear in many instances results in complete bearing destruction in a very short time resulting in operating inefficiency, high operational cost and in many cases complete operational breakdown of the arrest gear, until replacement of the broken swivels. Attempts to adapt bearings to the conventional commercial swivel design, which could accommodate the loading conditions of an arrest would require the bearing swivel to be of extreme size and weight, which would again be amplified by housing size and weight. Such additional mass would impose higher dynamic loading on the swivel and adjacent cable terminals, which presents still another operational problem.

It is one object of this invention to alleviate the above described problems associated with the use of conventional swivels by providing a novel self-braking swivel, whereby high rotational arrest cable speeds are not superimposed on high magnitude dynamic loading, thereby permitting utilization of smaller swivel bearings.

Another object is to provide in a self-braking swivel a first free rotation of the rotatable part of the swivel at thrust loads below the braking onset load to the swivel, whereby arrest cable or pendant twisting and high residual torque are eliminated.

Another object is to provide in a novel self-braking ball bearing swivel, a short swaged integral end fitting, whereby the swivel possesses lower total mass and length than in standard swivels having long swaged eye terminals, such lower mass and length resulting in lower swivel terminal loading resulting from kink waves in aircraft runway cross cables and whereby said swivel is free to be accelerated in rotation upon arrival of a kink wave at each of the runway cross cable swivels to align with each respective kink wave angle prior to the self-braking action of the swivel.

Still another object is to provide a novel swivel bearing arrangement, whereby the thrust load on the bearing may never exceed a predetermined load, since additional thrust load above said predetermined thrust load by-passes the bearing by the braking action of the brake means in the swivel housing, which by-pass action shifts the load path directly from the inner swivel shaft through the swivel housing to a connection at the other end.

The above and other objects and advantages of the present invention will appear more fully hereinafter from a consideration of the detailed description which follows, taken with the accompanying drawings wherein one embodiment thereof is illustrated. It is to be expressly understood, however, that the drawings are for the purpose of illustration only and are not intended as a definition of the limits of the invention.

In the drawings, wherein like reference characters refer to like parts throughout the several views.

Figure 3:
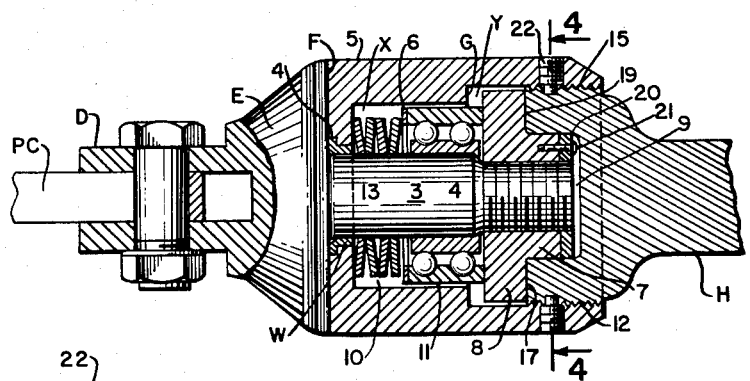
FIGURE 3 is a cross section view taken along section line 3—3 of FIGURE 2.
Figure 4:
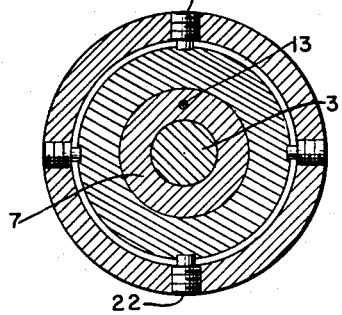
FIGURE 4 is a cross section view taken along section line 4—4 of FIGURE 3.

Referring to the drawing and with particular reference to FIGURE 3, the present novel swivel S consists of a shaft 3 with a threaded end 4 connected to a purchase cable or tape PC, which pays out and retrieves from a suitable arresting gear A or B on each side of a runway R. The shaft 3 is an integral part of an eyelet coupler means D, which is connected by suitable means, such as a nut and bolt assembly to the purchase cable or tape PC from one of the arrester mechanisms A or B. The cable or the tape PC is preferable of a synthetic plastic, such as nylon.

The shaft 3 has an enlarged mushroom portion E with an annular flat bearing surface F around the base of the shaft 3. This flat bearing surface F mates with a centrally apertured flat top exterior bearing surface of a rotatable hollow bell-shaped housing 5 formed with a bore to concentrically receive the shaft 3 which longitudinally extends therein.

The housing bore is counterbored to provide an intermediate annular shoulder G and an open mouth end with internal threads 12 at the end opposite to the flat bearing surface at the entry end of the housing from the shaft 3. The bearing surface opening of the housing is formed with an annular shoulder 13 to mate with the annular flange 14 of a swivel washer W. This washer may be of any suitable material, such, for example, as nylon or other self-lubricating material. The bell-shaped body of housing 5 is formed with two counterbored sections X and Y separated by the annular shoulder G. This shoulder G serves as a stop for a piston swivel 7 on the end of shaft 3, said piston swivel having an enlarged head 8 on which is engaged a ball bearing assembly 11. The swivel piston 7 has a threaded bore, which threads onto the threaded end 4 of the shaft 3.

The threaded end 4 of the shaft 3 terminates within the internally threaded area 12 of the bell mouth of the housing 5 and the reduced portion of the swivel piston 7 is frictionally mounted in a socket 9 with a smooth bore formed in the end of a swaged on arrest cable coupling assembly H, preferably of a suitable metal. This swage coupling H is externally formed with threads 15 which mate with the threads 12 in the bell mouth of the housing 5, so the annular peripheral rim 17 of the socket 9 in the swage coupling H seats against the annular land 19 under portion 8 of the swivel piston 7. The piston 7 is locked to the threads end of the shaft 3 by a lock plate 20 and a lock bolt 21, see FIGURE 3. Also, the swivel housing 5 and the threaded portion 12 thereof are locked in threaded relation to the swaged deck cable coupling member H by set screws 22.

In the chamber X of the bell housing 5 adjacent the swivel piston chamber Y are mounted in contiguous aligned relation around the swivel shaft 3, the aforementioned ball bearing assembly 11, a washer 6 and a stack of Belleville washers 10. These contiguous aligned elements are sandwiched between the top surface of the enlarged portion 8 of the swivel piston 7 and an annular land 23 provided by the interior surface of the chamber X at the entry portion inside of the housing 5.

*Representative operation*

Figure 1:
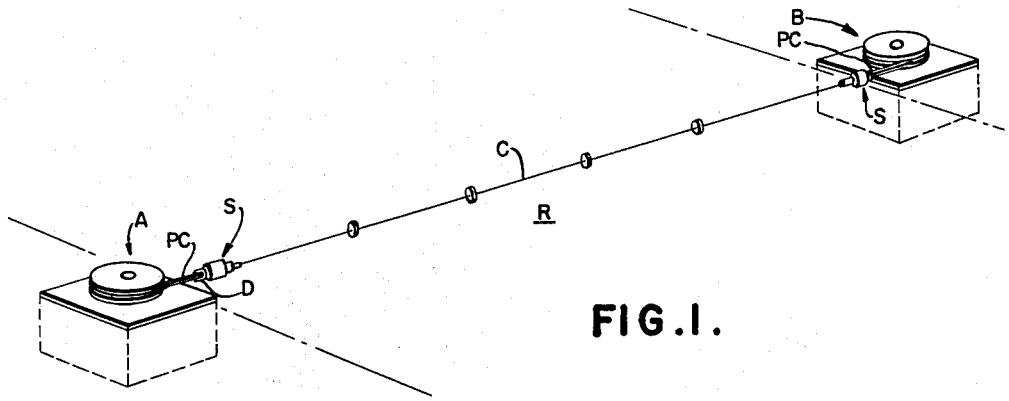
FIGURE 1 is a top plan view of an arrest gear arrangement and swivel connected deck cable across a runway.
Figure 2:
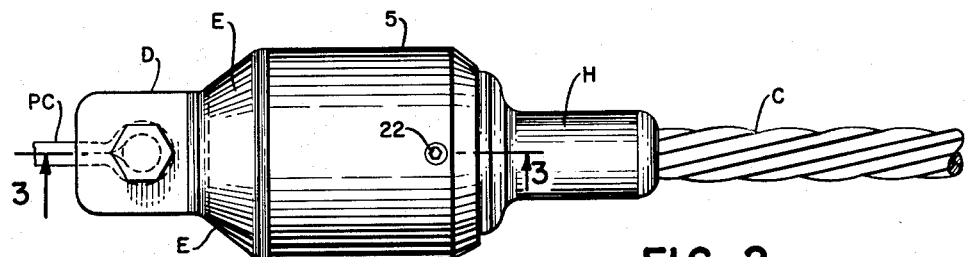
FIGURE 2 is a side elevation view of a swivel constructed according to the present invention.

A representative operation and use of the present novel swivel is illustrated in FIGURE 1, wherein the relative low tensile loading and high tensile loading of the swivel may be encountered. Thus, there is shown the runway pendant cable C with runway cable supports to facilitate aircraft arrest hook cable engagement.

The swivels S—S are shown installed at each side of the runway R adjacent the arresting engines A and B, which are described in detail in co-pending applications assigned to the assignee of the present invention.

When the arrest cable C is engaged by a landing aircraft the cable is pulled forward into an extending V-length and the purchase cables PC payout from the engines A and B. As the first load is applied to the cable during a runout the first loading is a low tensile loading and the swivel shaft 3 and piston 7 are free to rotate without any braking action. As the aircraft runout of the purchase cables or tapes progresses the tensile load increases, the Belleville washers 10 deflect between the bearing washer 6 and the surface 23 of the housing to provide braking of swivel rotation.

As the tensile load increases additional bearing load results between the housing and the piston head 8, resulting in greater resistance to rotation.

In a long runout aircraft arresting gear, the purchase cables or tapes may be of nylon material, while the deck cable is usually a spiral wound wire cable and when the aircraft hook engages and pulls the deck cable, the same under high load tends to rotate at relatively high speeds in excess, for example, of 3,000 r.p.m. with conventional swivels. Also, a short time after aircraft hook engagement a transverse wave or kink wave is developed in the deck cable and this kink wave strikes the swivels and adjacent fittings. To relieve the high strain imposed on the equipment, the purchase cable fitting, swivel and deck pendant must be free to be accelerated in rotation upon arrival of the kink wave at the deck pendant fitting, to thereby align with the kink wave angle. This manifestly is accomplished with the present novel swivel. Also, the present short swaged integral deck cable end fitting of the present novel swivel from the deck cable or pendant in combination with the free swivel rotation and then the self-braking action of the swivel provides with the lower mass and short fitting length, a much lower terminal loading than with conventional prior art swivel and cable fittings of relatively long swaged eye terminal type.

Thus there is provided a novel self-braking swivel adapted to retard high swivel velocities under longitudinal or combined longitudinal and lateral loading, thereby resulting in higher tolerable dynamic bearing capacity and in a swivel reduced in size, length and mass.

Without further description it is believed that the advantages of the present invention over the prior art is apparent and while only one embodiment of the same is illustrated, it is to be expressly understood that the same is not limited thereto as various changes may be made in the combination and arrangement of the parts illustrated, as will now likely appear to others and those skilled in the art. For a definition of the scope or limits of the invention, reference should be had to the appended claims.

What is claimed is:

1. In connection with an aircraft arresting arrangement comprising aircraft arrest engines, one on each side of a landing surface, each of said engines having a nylon purchase tape and a cross runway cable, a coupling means between the free end of each purchase tape of each of said arrest engines, and the respectively adjacent end of said runway cable, said coupling being in the form of a self-braking swivel comprising a hollow body, a shaft journalled and concentrically extended into the body from a coupling point exterior of one end of the body, said body being axially shiftable on said shaft and having a coupling element, said housing being rotatable with respect to the shaft, bearing means floatable on the shaft in the body, and load tension responsive brake means on the shaft between said bearing and the shaft entry end of said housing.

2. In connection with an aircraft arresting arrangement comprising aircraft arrest engines, one on each side of a landing surface, each of said engines having a nylon purchase tape and a cross runway cable, a coupling means between the free end of each purchase tape of each of said arrest engines, and the respectively adjacent end of said runway cable, said coupling being in the form of a self-braking swivel comprising a hollow body, a shaft journalled and concentrically extended into the body from a coupling point exterior of one end of the body, said body being axially shiftable on said shaft and having a coupling element, said housing being rotatable with respect to the shaft, bearing means floatable on the shaft in the body, and load tension responsive brake means on the shaft between said bearing and the shaft entry end of said housing, said brake means comprising a stack of tension load deflectable Belleville washers.

3. In connection with an aircraft arresting arrangement comprising aircraft arrest engines, one on each side of a landing surface, each of said engines having a nylon purchase tape and a cross runway cable, a coupling means between the free end of each purchase tape of each of said arrest engines, and the respectively adjacent end of said runway cable, said coupling being in the form of a self-braking swivel comprising a hollow body, a shaft journalled and concentrically extended into the body from a coupling point exterior of one end of the body, said body being axially shiftable on said shaft and having a coupling element, said housing being rotatable with respect to the shaft, bearing means floatable on the shaft in the body, and load tension responsive brake means on the shaft between said bearing and the shaft entry end of said housing, said shaft having an enlargement with a bearing surface engaging the exterior top surface of said housing, and a piston on the free end thereof adapted to apply said brake means.

4. An aircraft arresting arrangement comprising transversely spaced apart aircraft arrest engines of the rotary drum type, nylon purchase tape wound in each drum of each engine with a free coupling end from each drum, coupling means at each free end, a cross runway cable coupled to each tape by said coupling means, said coupling being a rotatable coupling comprising a bell housing, said housing having a top with an opening and a mouth, a shaft with coupling eyelets journalled in said housing whereby said housing and said shaft are rotatable with respect to each other, a swaged coupling mounted in the mouth of said bell housing said housing being counterbored to provide aligned chambers, said shaft being axially movable in the housing, one of said chambers having an end of said shaft therein, a piston secured to the end of said shaft and the other of said chambers having the intermediate portion of said shaft concentrically extending therethrough, said intermediate shaft portion being encircled by a roller bearing assembly, and between said roller bearing assembly and the top of said housing a brake means responsive to a reciprocal movement of the piston.

5. An aircraft arresting arrangement comprising transversely spaced apart aircraft arrest engines of the rotary drum type, nylon purchase tape wound in each drum of each engine with a free coupling end from each drum coupling means at each free end, a cross runway cable coupled to each tape by said coupling means, said coupling being a rotatable coupling comprising a bell housing, said housing having a top with an opening and a mouth, a shaft with coupling eyelets journalled in said housing whereby said housing and said shaft are rotatable with respect to each other, a swaged coupling mounted in the mouth of said bell housing, said housing being counterbored to provide aligned chambers, said shaft being axially movable in the housing, one of said chambers having an end of said shaft therein, a piston secured to the end of said shaft and the other of said chambers having the intermediate portion of said shaft concentrically extending therethrough, said intermediate shaft portion being encircled by a roller bearing assembly, and friction brake means interposed between said roller bearing assembly and the top of said housing.

6. In connection with an aircraft arresting arrangement comprising aircraft arrest engines, one on each side of a landing surface, each of said engines having a nylon purchase tape and a cross runway cable, a coupling means between the free end of each purchase tape of each of said of said arrest engines, and the respectively adjacent end of said runway cable, said coupling being in the form of a self-braking swivel subject to varying thrust loads comprising a swivel shaft, a swivel housing rotatable on said shaft and open at one end, said shaft extending into said open end of said housing and being axially movable in said housing, a floating bearing assembly between said shaft and said housing, brake means being positioned on said staff interposed between said floating bearing assembly and the open end of said housing operating in response to a predetermined thrust load to by-pass the bearing by the braking action of said brake means, whereby the load path between the tape and the cable is directly from the said swivel shaft through the swivel housing.

7. In an aircraft arresting arrangement including aircraft arresting means with a purchase cable on each side of a landing surface and a cross runway cable coupled to an end of each purchase cable of each of said arresting means, a self-braking swivel coupler between each purchase cable and each end of said runway cable, said swivel coupler comprising a shaft having an enlarged mushroom portion, said portion having a flat bearing surface, a bell-shaped housing having an apertured top portion with a flat bearing surface mating with said bearing surface of said mushroom portion, said shaft extending into said housing adjacent the interior of the mouth of the housing, means secured to the end of said shaft in the mouth of the housing, a short swaged runway cable coupling threaded into the mouth of the housing, said swaged coupling having a socket to receive a portion of said means on the end of said shaft, said shaft and said housing being axially movable with respect to each other, lock means to non-rotatably secure said runway cable swaged coupling in the housing mouth, an axially movable roller bearing assembly between said housing and said shaft contiguous to said means secured to the end of said shaft, and deflatable friction brake means between said shaft and said roller bearing assembly responsive to thrust loads on said swaged end cable coupling.

References Cited by the Examiner
UNITED STATES PATENTS 3,104,855  9/63  Barish _____ 244—142
3,142,458  7/64  Byrne et al. _____ 244—63

FERGUS S. MIDDLETON, Primary Examiner.
MILTON BUCHLER, Examiner.